(12) United States Patent
Feng et al.

(10) Patent No.: US 9,357,515 B2
(45) Date of Patent: May 31, 2016

(54) METHOD AND APPARATUS OF IMPLEMENTING TIME SYNCHRONIZATION

(71) Applicant: HUAWEI TECHNOLOGIES CO., LTD., Shenzhen (CN)

(72) Inventors: Liexun Feng, Shanghai (CN); Yong He, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 13/950,650

(22) Filed: Jul. 25, 2013

(65) Prior Publication Data

US 2013/0308626 A1    Nov. 21, 2013

Related U.S. Application Data

(63) Continuation of application No. PCT/CN2011/070671, filed on Jan. 26, 2011.

(51) Int. Cl.
*H04W 56/00* (2009.01)
*H04J 3/06* (2006.01)
*H04B 10/25* (2013.01)

(52) U.S. Cl.
CPC ........... *H04W 56/0015* (2013.01); *H04B 10/25* (2013.01); *H04J 3/0638* (2013.01); *H04J 3/0667* (2013.01)

(58) Field of Classification Search
CPC ......... H02J 2011/0096; H04B 7/2662; H04W 56/00; H04W 56/0045
See application file for complete search history.

(56) References Cited

U.S. PATENT DOCUMENTS

| | | |
|---|---|---|
| 7,493,129 B1 | 2/2009 | Mostafa et al. |
| 2002/0177460 A1* | 11/2002 | Beasley et al. ............... 455/502 |
| 2002/0187749 A1* | 12/2002 | Beasley et al. ............... 455/41 |
| 2003/0174666 A1 | 9/2003 | Wallace et al. |
| 2004/0181800 A1* | 9/2004 | Rakib et al. .................. 725/25 |

(Continued)

FOREIGN PATENT DOCUMENTS

| | | |
|---|---|---|
| CN | 101170399 A | 4/2008 |
| CN | 101267251 A | 9/2008 |

(Continued)

OTHER PUBLICATIONS

Extended European Search Report, dated Nov. 28, 2013, in corresponding European Application No. 11782867.3 (6 pages).

(Continued)

*Primary Examiner* — Hassan Phillips
*Assistant Examiner* — Prenell Jones
(74) *Attorney, Agent, or Firm* — Staas & Halsey LLP

(57) ABSTRACT

The present invention discloses a method of time synchronization and a base station system. The base station system includes a main unit, at least one radio unit, and a transmission medium adapted to transmit information between the main unit and the at least one radio unit. The base station system further includes a clock synchronization server configured close to the side of the at least one radio unit or integrated with the at least one radio unit. The clock synchronization server is adapted to transmit synchronization data to the main unit through the transmission medium, so that the main unit performs configuration processing according to the synchronization data to implement time synchronization with the clock synchronization server.

17 Claims, 4 Drawing Sheets

(56) References Cited

U.S. PATENT DOCUMENTS

| | | | |
|---|---|---|---|
| 2004/0181811 A1* | 9/2004 | Rakib | 725/122 |
| 2006/0161675 A1* | 7/2006 | Ducharme et al. | 709/231 |
| 2008/0181182 A1 | 7/2008 | Carichner et al. | |
| 2008/0287153 A1 | 11/2008 | Fullam | |
| 2009/0238154 A1 | 9/2009 | Bommas et al. | |
| 2009/0245228 A1 | 10/2009 | Osterling | |
| 2011/0076031 A1* | 3/2011 | Surek et al. | 398/161 |
| 2011/0122769 A1 | 5/2011 | Zhang | |

FOREIGN PATENT DOCUMENTS

| | | | |
|---|---|---|---|
| CN | 101346001 A | | 1/2009 |
| CN | 101860952 A | | 10/2010 |
| JP | 2005-520447 | | 7/2005 |
| JP | 2011-521503 | | 7/2011 |
| JP | 2011-526443 | | 10/2011 |
| RU | 2233033 C2 | | 7/2004 |
| RU | 89312 U1 | | 11/2009 |
| WO | 03/081810 A1 | | 10/2003 |
| WO | 2010/145611 A1 | | 12/2010 |

OTHER PUBLICATIONS

Japanese Office Action mailed Apr. 30, 2014, in corresponding Japanese Patent Application No. 2013-550729.
PCT International Search Report and Written Opinion of the International Searching Authority mailed Nov. 3, 2011 in corresponding International Application No. PCT/CN2011/070671.
Geoffrey M. Garner, "IEEE 1588 Version 2", ISPCS Ann Arbor'08, Sep. 24, 2008, pp. 1-89.
International Search Report mailed Nov. 3, 2011 in corresponding International Application No. PCT/CN2011/070671.
Chinese Search Report issued Mar. 21, 2014, in corresponding Chinese Patent Application No. 201180001697.9.
Chinese Office Action issued Apr. 1, 2014, in corresponding Chinese Patent Application No. 201180001697.9.
Russian Notice of Allowance dated Jan. 29, 2015 in corresponding Russian Patent Application No. 2013139301/07(059646).

* cited by examiner

METHOD AND APPARATUS OF IMPLEMENTING TIME SYNCHRONIZATION

CROSS REFERENCE TO RELATED APPLICATIONS

This application is a continuation of International Application No. PCT/CN2011/070671, filed on Jan. 26, 2011, which is hereby incorporated by reference in its entirety.

FIELD OF THE INVENTION

The present invention relates to the field of communications, and in particular, to a method and an apparatus of implementing time synchronization in a communication system.

BACKGROUND OF THE INVENTION

In a mobile communication system, a base station is an important component of a mobile communication network, and is adapted to receive and transmit radio signals and enable a user equipment (user equipment, UE) to access a wireless network.

Base station systems of existing communication networks have different networking solutions, for example, a base station may be disposed at a single location, or a baseband part and a radio frequency part of a base station may also be disposed at different locations (a base station with a distributed architecture). For the base station with a distributed architecture, that is, the baseband part and the radio frequency part of the base station are separated, the distance between a baseband circuit and a radio frequency circuit may be relatively short; or the base station may also have a main-remote design architecture, in which a radio unit part is remotely disposed relative to a baseband part of a main unit. The main unit (MU) performs baseband signal processing, and the main unit may include one or more baseband control units (baseband control unit, BBU). One or more radio units (remote radio unit, RRU) perform conversion between baseband and radio frequency, and transmit and receive signals on one or more antennas. Each RRU serves a geographical area or cell, and transmits uplink/downlink baseband signal and main control state information with the BBU through an interface unit. For a time division synchronization (Time Division Duplex, TDD) system, because base stations use the same frequency band for transmission and reception, the base stations need to keep time synchronization in order to avoid interference between the base stations.

In the prior art, time synchronization is implemented on conventional base stations through a satellite positioning system (for example, a global positioning system, GPS system, a BeiDou satellite system, a Galileo system, or the like). However, for a base station with a distributed architecture, the BBU and the RRU are separately configured, and if satellite positioning systems are installed in both the BBU and the RRU, the system architecture is complex, and the system cost is greatly increased.

SUMMARY OF THE INVENTION

Embodiments of the present invention provide a simple method capable of implementing time synchronization and a base station system.

Technical solutions in the embodiments of the present invention are implemented as follows:

In one aspect, the present invention provides a base station system, which includes a main unit (MU), at least one radio unit, and a transmission medium adapted to transmit information between the MU and the at least one radio unit, in which the base station system further includes:

a clock synchronization server, adapted to transmit synchronization data with the MU through the transmission medium, so that the MU performs configuration processing according to the synchronization data to implement time synchronization with the clock synchronization server, in which the clock synchronization server is configured close to a side of the at least one radio unit or integrated with the at least one radio unit.

In another aspect, the present invention provides a method of time synchronization in a base station system with a distributed architecture, in which the system includes a main unit, MU, at least one radio unit, and a clock synchronization server, wherein the clock synchronization server is configured close to the a side of the at least one radio unit or integrated with the at least one radio unit, and the method includes:

transmitting, by the clock synchronization server, a first synchronization data to the main unit through a transmission medium between the clock synchronization server and the main unit; and performing, by the main unit, configuration processing according to the first synchronization data to implement time synchronization with the clock synchronization server.

In the solutions provided in the embodiments of the present invention, a clock synchronization server is configured close to the side of the radio unit or integrated in the radio unit, and a transmission medium, such as an optical fiber, is used to transmit synchronization data between the clock synchronization server and the MU, so that time is synchronized between the MU and the clock synchronization server, and as a result, it is more flexible and convenient to select an MU site of the system, devices are simplified, and the cost can be lower.

DETAILED DESCRIPTION OF THE EMBODIMENTS

Embodiments of the present invention are introduced in detail below with reference to the accompanying drawings. In the following description, for the purpose of illustrating, rather than limiting the present invention, some specific details, for example, specific embodiments, operation processes, and technologies, are provided for a thorough understanding of the present invention. However, for persons skilled in the art, the present invention apparently may be implemented through other embodiments without the specific details. For example, although the present invention is described by taking a base station system with a distributed architecture as an example, and radio units are all described by taking a remote radio unit RRU of a base station with a distributed architecture in main-remote design, the present invention is not limited to the base station with a distributed architecture in main-remote design described in the embodiments, but is applicable to any base station with a distributed architecture, for example, the radio units of the base station may also be local radio units; for another example, the radio units of the base station may have a hybrid architecture in which a part of the radio units is local radio units and a part of the radio units is remote radio units. Data transmission between the radio unit and a main unit in the present invention is illustrated by taking an optical fiber as an example, but the present invention is not limited thereto. The radio unit and the main unit may also be connected through any other transmission medium such as a cable for data transmission. The structure of the base station system has any number of remote units that may be configured in any network topology which may couple at least one RRU with an optical fiber loop. The present invention may also be applied in any system that uses a hybrid base station. Although some of the following examples use a single optical fiber loop, the present invention may also be applied in a configuration in which multiple optical fibers are coupled.

In some embodiments, well-known methods, interfaces, and device signaling technologies are not described in detail, as a result ambiguity of the present invention due to unnecessary details is avoided. Furthermore, independent functional modules are shown in some figures. Persons skilled in the art should understand that the functions may be implemented by using a single hardware circuit, software running in conjunction with a suitably programmed digital microprocessor or general-purpose computer, an application specific integrated circuit (ASIC), and/or one or more digital signal processors (DSPs).

Figure 1:
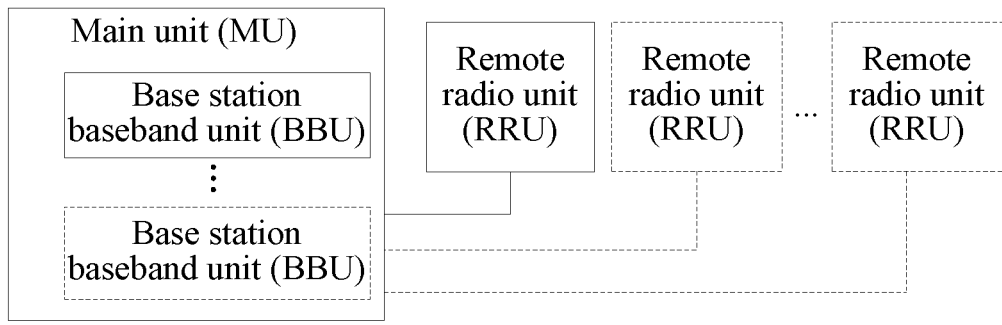
FIGS. 1A-1C are schematic diagrams of structures of a base station system in different configurations.
Figure 1:
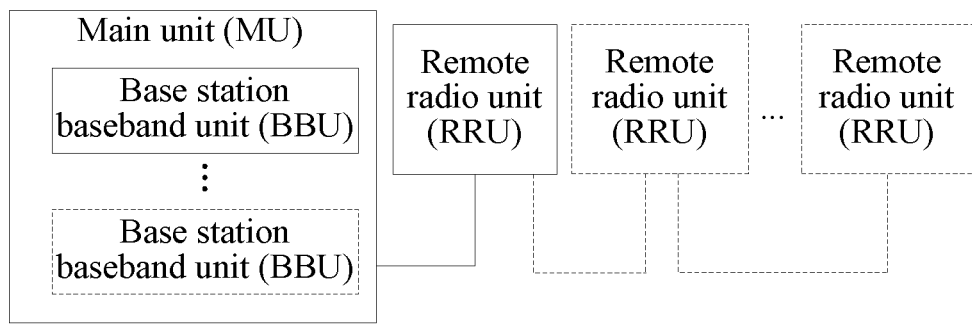
Figure 1:
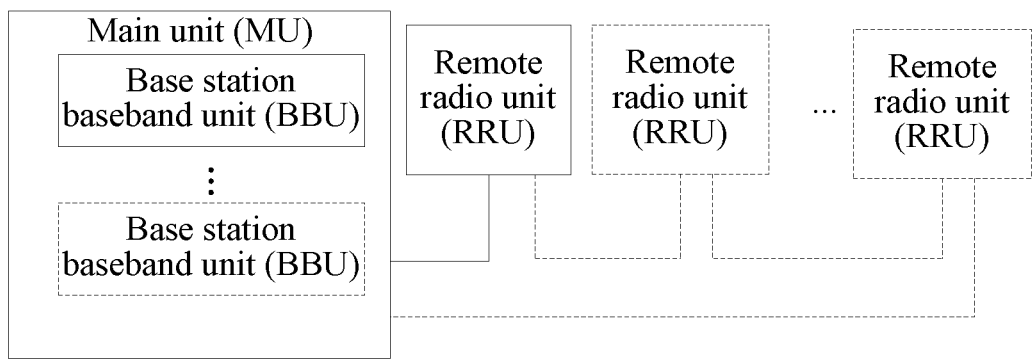

FIG. 1A to 1C show structures of a base station system in different configurations. The base station may include a main unit MU and at least one remote radio unit RRU, and the main unit MU includes at least one baseband unit BBU. For example, FIG. 1A shows a configuration structure of star connection, in which the main unit is connected to multiple remote radio units RRUs respectively through optical fibers. As further shown in FIG. 1B, the MU is connected to multiple RRUs in the form of a chain, and neighboring RRUs are connected in series. As still further shown in FIG. 1C, the MU is connected to multiple RRUs in the form of a ring. Persons skilled in the art may know that the MU and the RRU of the base station system still have other configuration manners, for example, the MU and the RRU are connected through a transmission medium such as a cable, which are not listed herein one by one. The MU of the base station system may include one or more BBUs. The BBUs are directly connected to each other through a cable or optical fiber to form a network topology structure of various forms; or, multiple BBUs may also be connected to each other through an additionally disposed switch BB box to form a network topology structure of various forms, for example, star form, chain form, ring form, and the like. Networking forms are flexible and diversified, which are not described in detail here.

Figure 2:
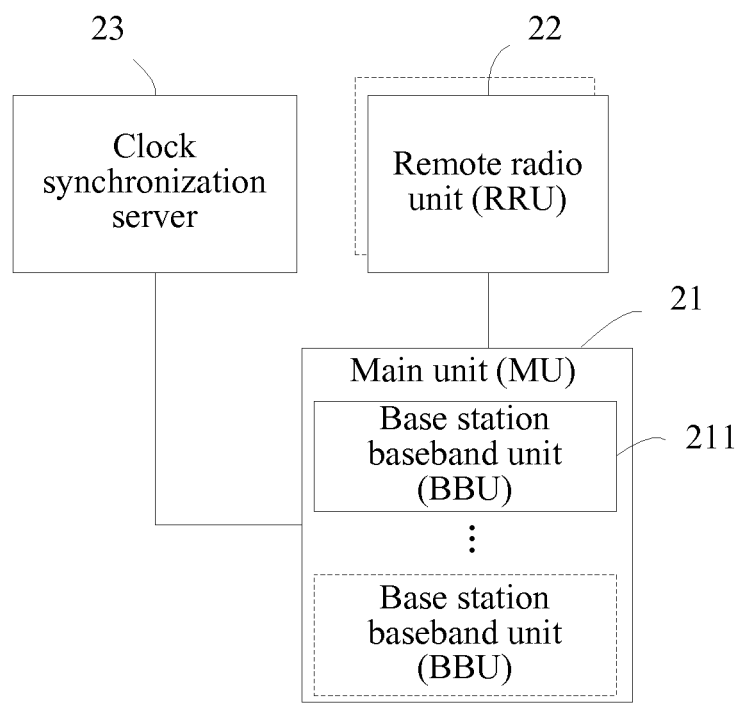
FIG. 2 is a schematic diagram of a network structure of a base station system according to Embodiment 1 of the present invention.

Embodiment 1 of the present invention provides a base station system and a method of time synchronization. As shown in FIG. 2, the base station system includes a main unit MU 21, at least one remote radio unit RRU 22, and an optical fiber adapted to transmit information between the MU 21 and the at least one RRU 22. The base station system further includes a clock synchronization server 23 adapted to transmit synchronization data with the MU 21 through the optical fiber, so that the MU 21 performs configuration processing according to the synchronization data to implement time synchronization with the clock synchronization server 23. The clock synchronization server 23 is configured close to the side of at least one RRU 22 or integrated with the at least one RRU.

In this embodiment, the MU 21 transmits synchronization data with the clock synchronization server 23, so that the MU 21 performs configuration processing according to the synchronization data to implement time synchronization with the clock synchronization server 23. It is unnecessary to install or provide a GPS system at the side of the MU of the base station system, so that the cost is low and it is more flexible and convenient to select an MU site. Not all RRUs need to support the GPS connection function, so that the cost of the RRUs is reduced. It is also unnecessary to configure a synchronous transmission line between the MU and the RRU, thereby reducing the networking cost. In addition, a wide range of clock synchronization servers may be selected, for example, a server supporting the IEEE 1588 protocol may be used, or a clock receiving module may also be used, so the device is simple, has low cost, and can be easily installed because the size of the device is suitable.

In this embodiment, the MU 21 may include one or more BBUs 211. As described above, the connection manners of the BBUs 211 may be various manners well known to persons skilled in the art, and are not described here again. Transmission of the synchronization data between the MU 21 and the clock synchronization server 23 may be implemented through a single optical fiber or transmission medium, and may also be implemented by sharing the optical fiber between the MU and the RRU.

As an example, the clock synchronization server includes a receiving module capable of receiving a synchronization reference signal of a satellite system to implement time calibration, thereby implementing time synchronization of the base station system and improving the accuracy of time synchronization. The satellite system includes a GPS system, a BeiDou satellite system, a Galileo system, a global navigation satellite system (Global Navigation Satellite System, GLONASS), or the like.

As an example, the clock synchronization server may be a server of the IEEE1588 protocol, or a server of other synchronization protocols, or other clock synchronization servers.

As an example, the clock synchronization server may be a server of the IEEE1588V2 protocol. The server of the IEEE 1588V2 protocol includes a satellite receiving module capable of receiving a synchronization reference signal of a satellite system. The server of the IEEE 1588V2 protocol further includes an IEEE 1588V2 protocol processing and communication circuit adapted to perform synchronization processing on the synchronization reference signal received from the satellite system and output synchronization data through an Ethernet port.

In the solution of the embodiment of the present invention, the number of the clock synchronization server may be one or more. For example, all BBUs in the MU unit may share one clock synchronization server so that the system has simple devices and low cost; or, clock synchronization servers may also be configured close to all different RRU sites or in all different RRUs, or clock synchronization servers may also be configured in a part of RRU sites or RRUs, so as to implement the backup function of synchronization data.

As an example, one or more transfer switches may be disposed at the side of the MU 21 or in the MU 21. The transfer switch is adapted to transmit synchronization data from the clock synchronization server 23 to multiple BBUs. The transfer switch may be a switch, for example, a LAN switch. For example, if the MU 21 includes two or more BBUs 11, transmission of the synchronization data between the multiple BBUs and the clock synchronization server may be implemented through the transfer switch.

Figure 3:
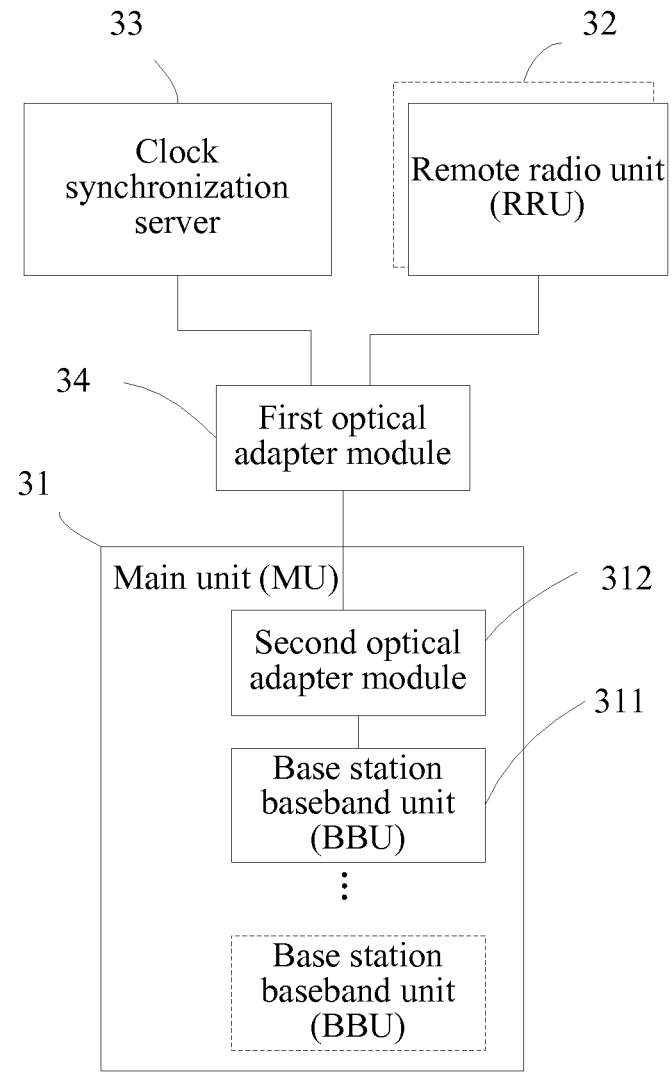
FIG. 3 is a schematic diagram of a network structure of a base station system according to Embodiment 2 of the present invention.

Embodiment 2 of the present invention provides a base station system and a method of time synchronization, as shown in FIG. 3. The base station system may have a distributed architecture in main-remote design, or an architecture in which radio units are designed at the local end, or a hybrid architecture in which a part of radio units are at the local end and a part of radio units are at the remote end. This embodiment is only illustrated by taking the main-remote architecture as an example. The base station system includes a main unit MU 31, at least one remote radio unit RRU 32, and an optical fiber adapted to transmit information between the MU 31 and the at least one RRU 32. The network structures of each remote unit RRU 32 and the main unit MU 31 may be different configuration structures as described above or other configuration structures well known in this field. For clarity, FIG. 3 only shows a connection relationship between one RRU 32 and the MU 31.

The MU 31 may include one or more baseband units BBUs 311 which may be installed in a machine room in a centralized manner. The BBU 311 may include a main control and clock synchronization unit, a baseband signal processing unit, a transmission unit, an interface unit, and the like. The specific structure and function of the BBU are known in this field, and are not described in detail here.

The RRU 32 is installed outdoors close to an antenna. The BBU is connected to multiple RRUs through a baseband radio frequency interface to transmit signals. For example, the baseband radio frequency interface may be a common radio interface CPRI or other standard interfaces or custom interfaces. The connection in the present invention is not limited to physical connection and may also be logical connection.

The base station system further includes a clock synchronization server 33 configured close to a side of a site where the RRU is installed or integrated with the RRU, for example, a functional module of the clock synchronization server may be integrated in the RRU. The clock synchronization server 33 is adapted to receive a synchronization reference signal from a global positioning system GPS and transmit synchronization data with the MU 31 through an optical fiber. The clock synchronization server 33 may include a GPS receiving module, a synchronization protocol processing and communication circuit, and the like. The clock synchronization server 33 receives the synchronization reference signal from the GPS through the GPS receiving module, performs synchronization processing, and outputs the synchronization data through an Ethernet port (FE port).

The base station system further includes a first optical adapter module 34 and a second optical adapter module 312. The first optical adapter module 34 and the second optical adapter module 312 are respectively configured close to the side of the RRU 32 and the side of the MU 31 or respectively configured in the RRU 32 and the MU 31, and are connected through an optical fiber. The first optical adapter module 34 is adapted to perform add-drop multiplexing on the synchronization data output by the clock synchronization server 33 and service data output by the RRU 32. The first optical adapter module is provided with a first optical fiber interface (not shown). The first optical adapter module 33 converges the synchronization data from the clock synchronization server 33 and the service data from the RRU 32 to the same optical fiber through a shared first optical fiber interface and transmits the converged synchronization data and service data to the second optical adapter module 312 at the side of the MU through the optical fiber. The second optical adapter module 312 splits the converged synchronization data and the service data and transmits the split synchronization data and service data to the MU 31.

The MU 31 receives the synchronization data and the service data, and performs corresponding configuration processing according to the synchronization data to implement time synchronization between the MU and the clock synchronization server 33. Persons skilled in the art may know that, after the MU obtains the synchronization data and the service data, the specific manner of performing configuration processing to implement time synchronization between the MU and the RRU is, for example, delay processing, periodic compensation, or the like, and is not described here again.

The above description of the process is only given for the path from the RRU to the MU, and the process is similar on the opposite path. The MU 31 outputs service data and synchronization data, converges the synchronization data and the service data to the same optical fiber through the second optical adapter module 312, and transmits the converged synchronization data and service data to the first optical adapter module 34 at the side of the RRU, and the first optical adapter module splits the converged synchronization data and the service data and transmits the split synchronization data and service data to the clock synchronization server 33 and the RRU 32 respectively. The synchronization data output by the MU 31 may be synchronization response data based on the synchronization data of the clock synchronization server.

As an example, after the second optical adapter module 312 splits the synchronization data of the clock synchronization server 33 and the service data of the RRU 32, the second optical adapter module 312 transmits the split synchronization data and service data to a synchronization interface and a baseband radio frequency interface of the BBU 311 of the MU 31 respectively. The baseband radio frequency interface may be common radio interface CPRI or other standard interfaces or custom interfaces. The BBU 311 performs configuration processing according to the received clock synchronization data and outputs a synchronization response signal and the service data. The synchronization response signal and the service data output by the BBU 311 are transmitted to the second optical adapter module through the synchronization interface and the baseband radio frequency interface of the BBU 311 respectively, transmitted to the first optical adapter module 34 through the optical fiber, and transmitted to the clock synchronization server 33 and the RRU 32 after add-drop multiplexing by the first optical adapter module. Time synchronization between the BBU 311 and the RRU 32 is implemented by data transmission between the BBU 311 and the RRU 32 through the baseband radio frequency interface. At least one BBU 311 of the MU 31 performs synchronization protocol communication with the clock synchronization server, so that time is synchronized between the at least one BBU 311 and the clock synchronization server, and therefore time is synchronized between the BBUs 311.

As an example, the clock synchronization server may be a server of the IEEE1588 protocol, or a server of other synchronization protocols, or other clock synchronization servers. By using a server of a synchronization protocol, for example, a server of the IEEE1588V2 protocol, the MU may easily perform synchronization protocol communication with the clock synchronization server, and therefore a transmission network does not need to support the synchronization protocol, so that network configuration requirements and cost are reduced.

As an example, the uplink and downlink transmission path between the MU and the RRU may be implemented by one shared optical fiber and may also be implemented by different optical fibers.

As an example, the first and the second optical adapter modules 34 and 312 may be optical add-drop multiplexers (Optical Add-Drop Multiplexer, OADM) and may also be other optical-electric modules.

As an example, the clock synchronization server, which includes a GPS receiving module or a GLONASS receiving module, is capable of receiving a synchronization reference signal of a satellite positioning system or GLONASS to implement time calibration, thereby implementing time synchronization of the base station system. The satellite positioning system may be a GPS system, a BeiDou satellite system, a Galileo system, or the like.

As an example, the number of the clock synchronization server 33 may be one or more. For example, all BBUs 311 in the MU 31 unit may share one clock synchronization server so that the system has simple devices and low cost; or, clock synchronization servers may also be configured close to all different RRU sites or in all different RRUs, or clock synchronization servers may also be configured in a part of RRU sites or RRUs, so as to implement the backup function of synchronization data.

In the base station system provided in the embodiment of the present invention, time synchronization of the base station system may be implemented without requiring an MU machine room to provide a GPS signal, so that the requirement for the selection of an MU site is reduced, and the MU machine room may be disposed more flexibly. The RRU also does not need to support the GPS connection function, so that the cost of the RRU is reduced. In the embodiment of the present invention, an optical adapter module is disposed so that synchronization data and service data share one optical fiber without configuring an optical fiber alone to transmit the synchronization data, thereby reducing the networking cost. In addition, a clock server and the optical adapter module are disposed to implement time synchronization of the base station system without changing the original interface configuration of the BBU and the RRU, so that the base station system has simple devices and low cost.

Figure 4:
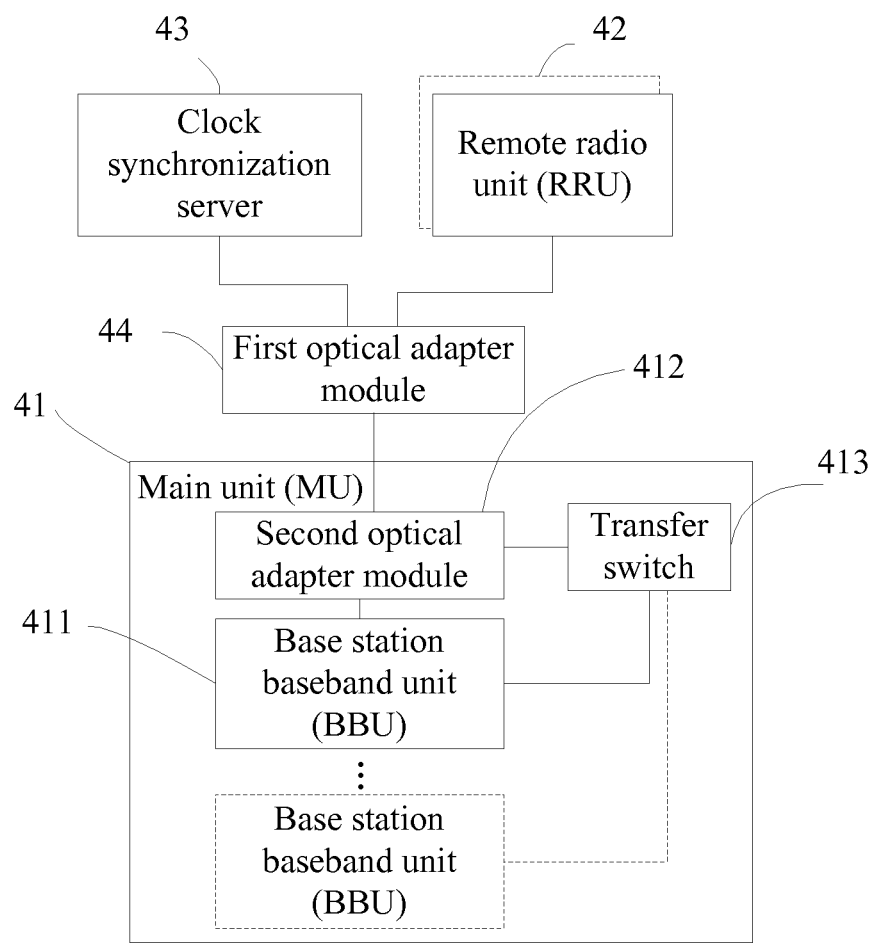
FIG. 4 is a schematic diagram of a network structure of a base station system according to Embodiment 3 of the present invention.

Embodiment 3 of the present invention provides a base station system and a method of time synchronization, as shown in FIG. 4. The base station system includes a main unit MU 41, at least one remote radio unit 42, a clock synchronization server 43, and a first optical adapter module 44 and a second optical adapter module 412 that are respectively disposed at the side of the RRU and the side of the MU. The base station system provided in this embodiment is similar to the base station system in Embodiment 2. The same part may be seen in the description of Embodiment 2, and are not described here again. The difference is mainly described below.

One or more transfer switches 413 are disposed at the side of the MU 41 or in the MU 41. The transfer switch 413 is connected to the second optical adapter module 412. After the second optical adapter module splits synchronization data of the clock synchronization server 43 and service data of the RRU 42 that are received, the second optical adapter module transmits the synchronization data of the clock synchronization server 43 to the transfer switch 413, for example, may transmit through an Ethernet interface. The transfer switch transfers and outputs received synchronization data to the BBU 211. The transfer switch may be a switch, for example, a Lanswitch. By disposing the transfer switch at the side of the MU 41, the MU may be disposed more flexibly, especially when the MU 41 includes two or more BBUs 411, transmission of synchronization data between the multiple BBUs and the clock synchronization server may be implemented through the transfer switch 413, which also facilitates capacity expansion of the base station system. For example, even if capacity of the base station system is expanded to add multiple BBUs, synchronization data may also be transmitted between the BBUs and the clock synchronization server conveniently, so as to implement time synchronization between the BBUs.

Persons skilled in the art should understand that all of or a part of processes in the method according to the embodiments may be implemented by a computer program instructing relevant hardware. The program may be stored in a computer readable storage medium. When the program is executed, the processes of the method according to the embodiments are performed. The storage medium may be a magnetic disk, an optical disk, a read-only memory (Read-Only Memory, ROM), or a random access memory (Random Access Memory, RAM).

The objectives, technical solutions, and beneficial effects of the present invention have been described in further detail through the above specific embodiments. It should be understood that the above descriptions are merely specific embodiments of the present invention, but not intended to limit the protection scope of the present invention. Any modification, equivalent replacement, or improvement made by persons skilled in the art without making creative efforts should fall within the protection scope of the present invention.

What is claimed is:

1. A base station system, comprising:
   a main unit,
   at least one radio unit,
   an optical fiber configured to transmit information between the main unit and the at least one radio unit,
   a clock synchronization server configured to transmit a first synchronization data from the clock synchronization server to the main unit through the optical fiber, wherein the main unit is configured to perform configuration processing according to the first synchronization data to implement time synchronization with the clock synchronization server,
   the clock synchronization server is configured close to a side of the at least one radio unit or integrated with the at least one radio unit,
   the base station system further comprises a first optical adapter module coupled to the at least one radio unit and the clock synchronization server,
   the first optical adapter module includes a first optical fiber interface coupled to the optical fiber,
   the first optical adapter module is configured to converge the first synchronization data and a first service data from the at least one radio unit, and transmit the converged first synchronization data and first service data through the first optical fiber interface, and
   the first optical adapter module is configured close to the side of the at least one radio unit or integrated with the at least one radio unit.

2. The base station system according to claim 1, wherein
   the base station system further comprises a second optical adapter module,
   the second optical adapter module is coupled to the main unit and configured close to a side of the main unit or integrated with the main unit,
   the second optical adapter module comprises a second optical fiber interface, and the second optical fiber interface and the first optical fiber interface of the first optical adapter module are connected through the optical fiber.

3. The base station system according to claim 2, wherein the second optical adapter module is configured to
receive the converged first synchronization data and first service data through the second optical fiber interface,
split the converged first synchronization data and first service data and
transmit the split first synchronization data and the split first service data to the main unit.

4. The base station system according to claim 3, wherein the second optical adapter module is further configured to
converge a second synchronization data and a second service data from the main unit, and
transmit the converged second synchronization data and second service data through the second optical fiber interface.

5. The base station system according to claim 4, wherein the main unit comprises at least one baseband unit (BBU),
the at least one BBU comprises a baseband radio frequency interface and a synchronization interface coupled to the second optical adapter module,
the baseband radio frequency interface is configured to transmit the second service data and receive the first service data, and
the synchronization interface is configured to transmit the second synchronization data, and receive the first synchronization data.

6. The base station system according to claim 5, wherein the at least one baseband unit BBU comprises at least two BBUs,
the main unit further comprises at least one transfer switch coupled between the second optical adapter module and the at least two BBUs, and
the at least one transfer switch is configured to transmit the first synchronization data to the at least two BBUs from the clock synchronization server, and receive the second synchronization data from the at least two BBUs.

7. The base station system according to claim 2, wherein the first optical adapter module and the second optical adapter module are optical add-drop multiplexers (OADMs).

8. The base station system according to claim 1, wherein the first optical adapter module is an OADM.

9. The base station system according to claim 1, wherein the clock synchronization server is a server of an IEEE 1588 protocol.

10. The base station system according to claim 1, wherein the clock synchronization server comprises a receiving module configured to receive a synchronization reference signal from a satellite system.

11. A method of time synchronization in a base station system, comprising:
transmitting, by a clock synchronization server in the base station system, a first synchronization data to a main unit in the base station system through a an optical fiber between the clock synchronization server and the main unit, wherein the clock synchronization server is configured close to a side of the at least one radio unit in the base station system or integrated with the at least one radio unit; and
performing, by the main unit, configuration processing according to the first synchronization data to implement time synchronization with the clock synchronization server;
transmitting, by the at least one radio unit, a first service data to the main unit through the optical fiber;
wherein the first service data and the first synchronization data are transmitted to a first optical adapter module coupled to the at least one radio unit and the clock synchronization server, and converged by the first optical adapter module; and
wherein the converged first service data and first synchronization data are transmitted by the first optical adapter module through the optical fiber.

12. The method according to claim 11, wherein the converged first service data and the first synchronization data are transmitted by the first optical adapter module to a second optical adapter module through the optical fiber, and wherein the second optical adapter module is coupled to the main unit.

13. The method according to claim 12, wherein the converged first service data and first synchronization data is split by the second optical adapter module, and the split first synchronization data and the split first service data is transmitted to the main unit by the second optical adapter module.

14. The method according to claim 12, wherein a second synchronization data and a second service data from the main unit is converged by the second optical adapter module, and the converged second synchronization data and second service data is transmitted by the second optical adapter module through the optical fiber.

15. The method according to claim 11, wherein the main unit comprises at least one baseband unit, BBU.

16. The method according to claim 11, wherein the first optical adapter module is an optical add-drop multiplexer, OADM.

17. The method according claim 11, wherein the clock synchronization server comprises a receiving module configured to receive a synchronization reference signal from a satellite system to implement time synchronization with the satellite system.

* * * * *